June 23, 1964 D. LABINO 3,138,561
RADIATION RESISTING GLASS COMPOSITION
Original Filed Nov. 23, 1953
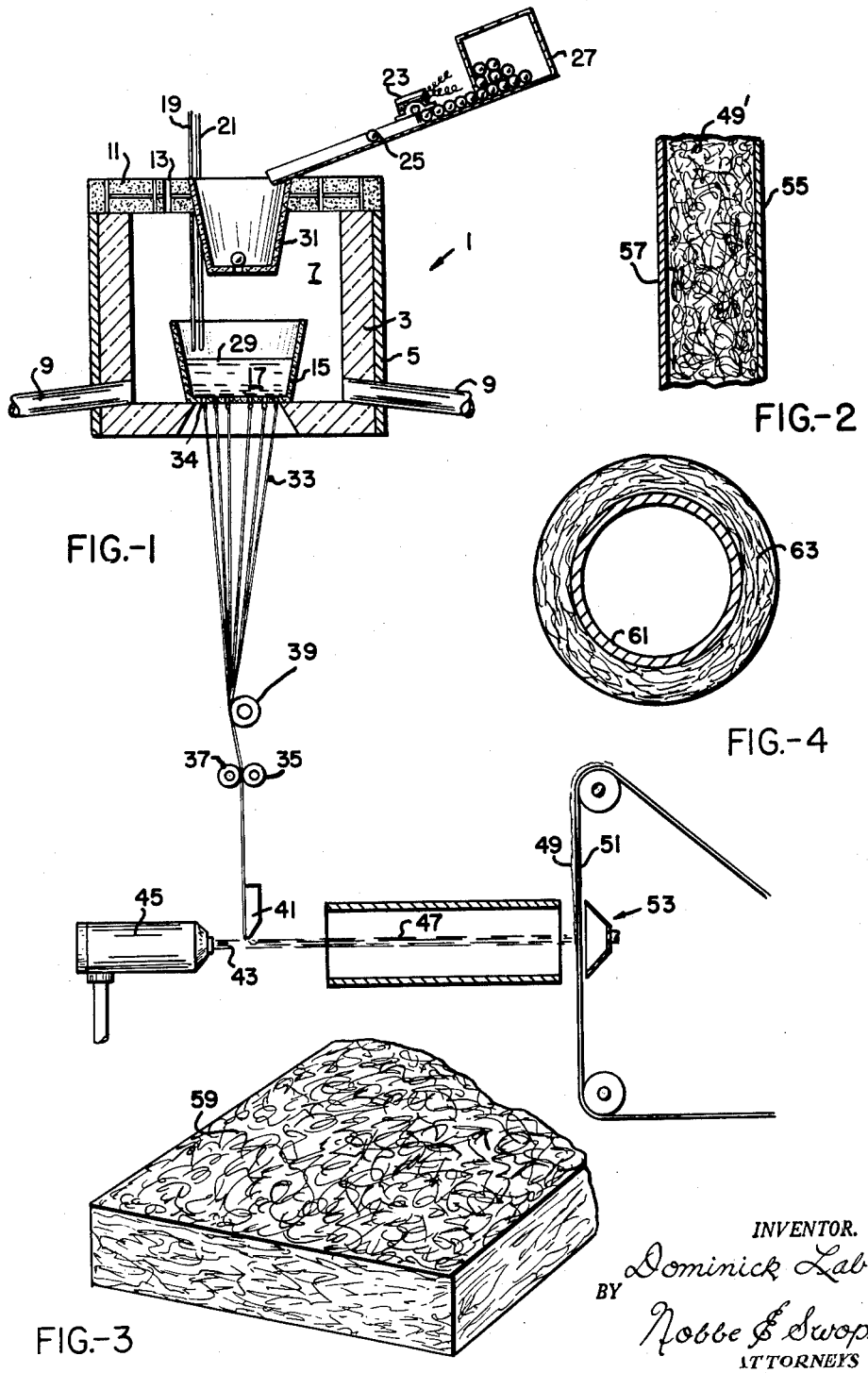

3,138,561
RADIATION RESISTING GLASS COMPOSITION
Dominick Labino, Grand Rapids, Ohio, assignor, by mesne assignments, to Johns-Manville Fiber Glass Inc., Cleveland, Ohio, a corporation of Delaware
Original application Nov. 23, 1953, Ser. No. 393,577, now Patent No. 2,830,000, dated Apr. 8, 1958. Divided and this application July 1, 1957, Ser. No. 669,121
5 Claims. (Cl. 252—478)

This invention relates to insulation material which is useful in radiation shields; more particularly the invention relates to a glass composition which is useful in the production of the shield.

This application is a division of my copending application Serial No. 393,577, filed November 23, 1953, now U.S. Patent No. 2,830,000.

Effective radiation-resisting structures employing materials of relatively low density and also having a capacity for resisting high temperatures are desirable in modern stationary as well as mobile installations. Further such materials are of utility in specialized clothing applications, for example radiation-protection gear and fire entry suits.

It is an important object of this invention to provide novel compositions of glass which are useful in the production of radiation-resisting materials for use in stationary and mobile applications.

It is a primary object of this invention to provide a radiation shield of novel composition which is particularly resistant to the passage of nuclear as well as heat radiation.

It is a particular object of this invention to provide novel glass compositions from which glass fibers of sub-micron diameters may be readily formed.

It is a further object of this invention to describe fiberizing glass compositions which are less susceptible to devitrification at the working temperature than are the usual soda-lime or borosilicate fiberizing compositions.

It is also a further object of this invention to describe fiberizing compositions which readily produce very fine diameter fibers—as small as 0.04 micron—and a mass of which fibers is uniformly more fine than is obtainable with fibers of the borosilicates glasses.

These and other allied objectives of the invention are attained by providing a glass composition which comprises at least three components PbO, $R_2O$ (alkali metal oxides) and $SiO_2$; the proportion of PbO to $SiO_2$ is variable within a fairly wide range but as the percentage of $SiO_2$ is decreased the introduction of another glass forming oxide, preferably $B_2O_3$ becomes necessary.

The new glasses may contain by weight 37–60% PbO, 20–50% $SiO_2$, 8–14% alkaline oxide, and 0–10% $B_2O_3$; below about 40% $SiO_2$ and the $B_2O_3$ should be included although to a lesser extent than the $SiO_2$ which it replaces. Preferably the proportions should be 37–45% PbO, 45–50% $SiO_2$, 11–13% alkaline oxide, and 2–4% $B_2O_3$ as these latter compositions produce fiberizing glasses which are readily formable into very fine fibers at low (1700–1800° F.) operating or working temperatures, much lower temperatures than may be utilized with the borosilicates.

Preferably also the glasses contain $Na_2O$ as well as $K_2O$. The $K_2O$ is usually introduced into the glass batch as potassium nitrate, the nitrate serving to produce oxidizing conditions for the lead-glass batch; however, the use of red lead for batch formation also provides oxygen during melting and overcomes the tendency to reducing action therefore permitting some reduction in the potassium nitrate and $K_2O$—the $K_2O$ is then suitably replaced with $Na_2O$—the mixture of $Na_2O$ and $K_2O$ being most suitable for founding.

Minor constituents of other oxides may be present but should not exceed about 4–5% by weight of the batch. These ingredients may include oxides or nitrates of the second periodic group and/or $Al_2O_3$ and fluorine, for example. Such constituents aid in viscosity control and improvement of stability of the glass with respect to devitrification and durability.

Glass compositions generally which are within the scope of the invention include:

|  | #1 | #2 | #3 |
|---|---|---|---|
| $SiO_2$ | 47.3 | 20.4 | 39.4 |
| PbO | 37.0 | 60.0 | 45.0 |
| $K_2O$ | 12.8 | 8.0 | 6.6 |
| $Na_2O$ | .7 | 3.1 | 2.8 |
| $B_2O_3$ | 2.2 | 8.5 | 6.2 |
|  | 100.0 | 100.0 | 100.0 |

Composition #1 is preferred; composition #3 is very useful but is more subject to devitrification at the working temperature than is composition #1. The working temperature for filament drawing in each case is about 1700–1800° F. In each instance the sum of the glass forming oxides, the lead oxide and the alkaline oxide should exceed 95% although as noted a minor percent of other ingredients may be substituted if desired.

The compositions described are eminently suitable for drawing into filaments and formation into fine, blown fibers of less than sub-micron diameter. These extremely small fibers are self-adherent, absorbent to liquids, flexible, do not powder when subjected to stress, and may be readily produced in paper or pad form to provide useful heat insulation and radiation resistant materials.

A fluffy mass of the small fibers tends to be compact with only slight pressure, this is occasioned because the small fibers tend to cohere and the gravity of the material is relatively high which tends to cause the fibers of a mass to come together. The blown mass of small fibers however does not lose its fluffy appearance completely and air is readily enclosed within a mass of the same to render the product suitable as insulation.

The invention will be more fully understood by reference to the following detailed description and accompanying drawings wherein:

FIG. 1 is a schematic representation of apparatus useful in the formation of fibrous glass with the composition of invention;

FIG. 2 is a partial view of clothing, as a fire entry suit, having insulation produced from the novel composition of invention;

FIG. 3 illustrates a compacted batt consisting of fine fibers produced from the composition of invention; and FIG. 4 illustrates the use of a paper insulation produced from the compositions of invention.

Referring to FIGURE 1 there is shown generally at 1 apparatus which is particularly useful in the formation of filaments and fibers from glasses of high lead content. As shown in the figure a body of refractory material 3 supported within a metal casing 5 is provided with a hollow chamber 7 and a plurality of ports 9 pass through the walls of the refractory 3 to communicate with the interior of the chamber.

The upper portion of the refractory 3 and metal casing 5 support brickwork 11 which is provided with at least one aperture 13. Gases of combustion comprising, for example, fuel gas, and air enter the conduits 9 and are burned in the spacing 7, the exhaust gases of combustion passing out through the apertures 13.

Supported within the body 3 is a crucible 15 of a fire-clay material, such as sillimanite, for the retention of molten glass. This crucible is adapted to be contacted substantially tangentially by the entering gases of combustion, which as they burn heat the walls of the crucible to render molten the glass body 17 maintained within the crucible.

Extending into the crucible and adapted to contact the molten body of glass when the same is at a sufficiently high level are electrodes 19, 21, the electrodes being connected to a suitable electric circuit to actuate the solenoid 23 and permit the flow of glass marbles 25 from hopper 27 when the liquid level 29 is low as shown in FIGURE 1.

The entering marbles drop into a crucible 31 also of a fire-clay material and the glass and the marbles are rendered molten by the exhaust gas passing upwardly from the chamber 7 to the aperture 13; consequently the glass fed to the crucible 15 is at substantially the same temperature as the glass within the molten body 17 and very little change in temperature is occasioned as glass enters to replace that withdrawn in the formation of the fibers and filaments.

The base of crucible 15 is provided with apertures through which filaments 33 are drawn by the rotation of drawing rolls 35, 37, the filaments in their passage being grouped when sufficiently hardened over a guide roll 39. The filaments, as shown in FIGURE 1, are then passed in substantially parallel relation over a stationary guide block 41 and are exposed to a gaseous blast 43 formed by burning a combustible gas such as fuel gas and air within the burner 45. The gaseous blast as it contacts the filament at the lower edge of guide block 41 has a temperature of approximately 3300-3500° F. and a velocity of approximately 1600-2000 feet per second. Therefore the small glass filments which may have a diameter on the order of 0.003" to 0.007" are blown into very fine fibers 47 which are collected in a fluffy mass 49 on a suitable belt 51; suction apparatus indicated generally at 53 may be provided to assist in the collection of the very fine fibers (as low as 0.04 micron) on the belt.

In connection with the apparatus of FIGURE 1 it is to be particularly noted that the fire-clay crucible 15 being of ceramic material is resistant to the action of lead glasses and the material of the crucible is substantially not attacked thereby. This is important not only to the life of the crucible itself but to the purity and uniformity of the diameter of the fibers attained since the orifices 34 maintain their required diameter over a long period of life, thus bringing to the product the noted advantageous properties.

A mass of the fibers collected as at 49 is useful by itself as insulating material; it may also be utilized as shown in FIGURE 2 wherein a fluffy mass of the fibers indicated at 49' is sandwiched between outer facing 55 which consists of a thin foil of Monel metal and an inner facing of heat reflective metal 57 such as aluminum foil.

As indicated in FIGURE 3 the fibers from the glasses of invention may be formed into a compact batt 59 and utilized substantially as blocks of insulation material.

Referring now to FIGURE 4 there is shown therein an inner conduit 61 of metal through which in service use hot gases or gases bearing radioactive materials may pass. Surrounding the conduit 61 is a layer 63 of paper formed from the fibers collected as at 49.

To produce the paper from the fibers it is merely necessary to disperse the fibers in water, preferably with a slight beating action, and then to drain off the fibers, leaving a sheet material, which when dry is flexible, of good strength, and particularly useful where insulation is required and space is at a premium.

Any of the glasses of invention referred to hereinbefore may be utilized in the production of fibers 49 although compositions #1 and #3 have been found to be preferable for most purposes these being the most suitable for general application.

The glasses of invention have been particularly described with respect to blown fiber formation, but it is to be understood that the glass compositions are useful in filamentary form as well, that is in the form indicated at 33 in FIGURE 1.

It will be understood that this invention is susceptible to modification in order to adopt it to different usages and conditions and accordingly, it is desired to comprehend such modifications within this invention as may fall within the scope of the appended claims.

I claim:

1. A radiation resistant glass composition capable of lower temperature formation of glass fibers having submicron diameters, consisting essentially by approximate weight of:

| | Percent |
|---|---|
| PbO | 37-45 |
| $SiO_2$ | 45-50 |
| Alkali metal oxide | 11-13 |
| $B_2O_3$ | 2-4 |

2. Radiation resisting glass in fiber form having a composition consisting essentially by approximate weight of:

| | Percent |
|---|---|
| PbO | 37-45 |
| $SiO_2$ | 45-50 |
| Alkali metal oxide | 11-13 |
| $B_2O_3$ | 2-4 |

3. Radiation resisting glass fibers in paper-like sheet form having diameters not greater than 1 micron, the composition of the glass of said fibers consisting essentially by approximate weight of:

| | Percent |
|---|---|
| PbO | 37-45 |
| $SiO_2$ | 45-50 |
| Alkali metal oxide | 11-13 |
| $B_2O_3$ | 2-4 |

4. Radiation resisting glass fibers in batt form wherein the composition of the glass of said fibers consists essentially by approximate weight of:

| | Percent |
|---|---|
| PbO | 37-45 |
| $SiO_2$ | 45-50 |
| Alkali metal oxide | 11-13 |
| $B_2O_3$ | 2-4 |

5. Radiation resisting glass fibers capable of submicron diameter formation of random interengaged array and fluffy mass form wherein in the composition of the glass of the fibers consists by weight of:

| | Percent |
|---|---|
| PbO | 37.0 |
| $SiO_2$ | 47.3 |
| $K_2O$ | 12.8 |
| $Na_2O$ | 0.7 |
| $B_2O_3$ | 2.2 |

References Cited in the file of this patent

UNITED STATES PATENTS

| | | |
|---|---|---|
| 349,183 | Stewart | Sept. 14, 1886 |
| 1,508,455 | Kraus | Sept. 16, 1924 |
| 2,197,562 | Reinker | Apr. 16, 1940 |
| 2,389,305 | Goodwin | Nov. 20, 1945 |
| 2,489,242 | Slayter et al. | Nov. 22, 1949 |
| 2,671,492 | Biordi et al. | Mar. 9, 1954 |
| 2,699,399 | Armistead | Jan. 11, 1955 |
| 2,736,714 | Tiede | Feb. 28, 1956 |